United States Patent Office 2,971,078
Patented Feb. 7, 1961

2,971,078

PROCESS OF ELECTRICAL DISCHARGE MACHINING WITH CHROMIUM ELECTRODE

John S. Larkins, Jr., Birmingham, Mich., assignor to Elox Corporation of Michigan, Royal Oak, Mich., a corporation of Michigan No Drawing. Continuation of application Ser. No. 680,384, Aug. 26, 1957. This application Feb. 13, 1959, Ser. No. 792,948

2 Claims. (Cl. 219—69)

This invention relates to electrical discharge machining, sometimes referred to as EDM, and particularly to an improved process of electrical discharge machining utilizing chromium electrodes.

Use of EDM for machining hard materials such as hard steels and cemented carbides used for forging dies has increased tremendously in recent years. As is now generally known, the electrical-discharge-machining process comprises disposing an electrode in spaced proximity to a workpiece to be machined and causing intermittent electrical discharge between the electrode and the workpiece in the presence of a dielectric coolant, in consequence of which the workpiece is eroded. The shape and form of the eroded hole is complementary to the electrode.

It is possible by means of EDM to produce very economically, identical dies by the following method. A die is produced in the normal manner, i.e. by Kellering and hand finishing. An electrode or series of electrodes is then cast using the die cavity as a mold. The electrode may be then used to produce an infinite number of identical die cavities by EDM.

One difficulty with the above mentioned method is connected with the fact that in the EDM process, there is erosion of the electrode as well as the workpiece during the machining operation. This electrode erosion is caused by bombardment of the eroded particles machined from the workpiece, and other things, and renders it necessary to replace electrodes frequently, especially when machining deep or intricate cavities, in order to obtain the desired accuracy of the finished hole.

Various electrode materials have been tried with varying degrees of success. A suitable electrode material must be of low cost, easily obtainable, easy to cast or machine and must have a favorable wear ratio in use. Most materials in common use lack one or more of these desirable characteristics. For example, commercial brass has a wear ratio of only about 3 to 1, is fairly easy to machine, but is difficult to cast, which renders it expensive to use in instances where a deep intricate cavity is required because many electrodes are used and the EDM apparatus must be shut down frequently to change electrodes. Commercially pure zinc is easily cast, but its wear ratio is only 7.5 to 1. A number of alloys of zinc, particularly zinc-tin alloys, have been tried with significant increase in wear ratio.

After a great deal of research and experimentation, I have found that electrodeposited chromium makes a superior electrode material for EDM.

An electrode of zinc, brass or other material plated with chromium to a thickness .0001 or greater provides a wear ratio, when machining steel, of 50 to 1 in high current density roughing operations and wear ratios in the order of 100 or better to 1, in low current density finishing operations.

Because the chromium plate itself, rather than the core of the electrode, is exposed to the erosive bombardment during machining, the material on which the chrome is adhered is of little important except that it must be capable of being easily formed to the required shape and must support the chrome during use. Almost any cheap, low melting point, easily cast alloy or metal is suitable as are resins, plastics or even wood.

By way of example, electrodes have been made by casting plastic material or low melting point alloy (such as zinc base alloy) in a die cavity and plating the resulting cast core with chromium. It is necessary that the core material used be capable of reproducing exactly the detail of the cavity and that the plating operation be such that the plate is uniform, there is no buildup of plate on protruding portions and no thinning in internal radii. With this method, it is necessary that the original mold or die be produced by methods other than EDM. Identical dies or molds in infinite number may then be produced by means of EDM.

In instances where the first or original die is to be produced by EDM, the electrodes may be produced by utilizing a sample of the article to be cast or forged, or a hand carved model of the same as a pattern and casting the required number of electrode cores by investment or sand casting, or by the "lost wax" method. The cores are then chrome plated and used as electrodes.

Because the electrodes thus produced may be stripped and replated to size, the process is very economical especially where a large number of electrodes may be required.

In making die-casting dies, forging dies, plastic molds and the like, a tolerance of .0005 inch is usual. The EDM process, when correctly used will machine with a gap of .0005 or less so correctly sized cavities are obtainable even when using a plated core that may have been made in the original cavity. In instances where an oversize cavity would result because of accumulated tolerance in the original cavity, unusually close accuracy desired in the finished article, high EDM machining rate during roughing (with consequent high voltage and wider gap), or for other reasons, the electrode core, of whatever material, may be reduced in size before plating, such as by acid etching, solvent bath or the like. The core is then plated to desired dimensions for electrode use.

Another method of making chromium electrodes is to plate the original cavity by direct immersion in a plating bath, remove the plated shell from the cavity and reinforce the shell by filling it with thermoplastic resin, low melting point alloy or the like. The reinforcement will have the shank for insertion into the electrode holder, and in instances where a plastic is used, an electrical connection is made to the shell for EDM.

It will thus be seen that I have effected an improvement in the process of electrical discharge machining through the use of improved electrode material.

This application is a continuation of my co-pending application, Serial No. 680,384, filed August 26, 1957.

I claim:
1. The process of machining a conductive workpiece by electrical erosion which comprises, disposing an electrode having a wear surface of chromium and a shape complementary to the cavity to be machined in gap relationship to the workpiece and passing across the gap intermittent, unidirectional, short duration, electrical discharges in the presence of a dielectric coolant.
2. The process of machining a conductive workpiece by electrical erosion which comprises, disposing an electrode having a wear surface of electrodeposited chromium of a minimum thickness of .0001 inch and a shape complementary to the cavity to be machined in gap relationship to the workpiece and passing across the gap intermittent, unidirectional, short duration, electrical discharges in the presence of a dielectric coolant.

References Cited in the file of this patent

UNITED STATES PATENTS

| | | |
|---|---|---|
| 2,427,588 | Burnett | Sept. 16, 1947 |
| 2,650,979 | Teubner | Sept. 1, 1953 |